United States Patent
Terajima

(10) Patent No.: US 10,261,285 B2
(45) Date of Patent: Apr. 16, 2019

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology. Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY. CO., LTD., Huizhou (CN)

( * ) Notice: Subject to any disclaimer, the term of this patent is extended or adjusted under 35 U.S.C. 154(b) by 164 days.

(21) Appl. No.: 15/230,476

(22) Filed: Aug. 7, 2016

(65) Prior Publication Data
US 2017/0045707 A1  Feb. 16, 2017

(30) Foreign Application Priority Data
Aug. 11, 2015 (JP) .................................. 2015-159018

(51) Int. Cl.
  *G02B 7/09* (2006.01)
  *G03B 3/10* (2006.01)
  (Continued)

(52) U.S. Cl.
CPC ............. *G02B 7/09* (2013.01); *G02B 27/646* (2013.01); *G03B 3/10* (2013.01); *G03B 5/06* (2013.01);
(Continued)

(58) Field of Classification Search
CPC .......... G02B 7/09; G02B 27/646; G03B 3/10; G03B 5/06; G03B 2205/007;
(Continued)

(56) References Cited

U.S. PATENT DOCUMENTS

| 6,385,146 B1 * | 5/2002 | Choi ....................... G11B 7/093 |
| | | 359/814 |
| 8,805,176 B1 * | 8/2014 | Chou ....................... G03B 3/10 |
| | | 396/133 |

(Continued)

FOREIGN PATENT DOCUMENTS

WO    WO 2010043078 A1 *  4/2010  ............... G02B 7/08

*Primary Examiner* — Cara E Rakowski
(74) *Attorney, Agent, or Firm* — Hemisphere Law, PLLC; Zhigang Ma

(57) ABSTRACT

The present invention aims to provide a lens driving device capable of realizing the reduction of power consumption by improving the driving efficiency of an electromagnetic drive mechanism. The lens driving device includes: one or mores drive coils having one or more forward path sides and one or more return path sides, and drive magnets each having a forward path side magnet plate and a return path side magnet plate. The magnetization directions of the forward path side magnet plate and the return path side magnet plate of each drive magnets define an angle which is expanded towards the oppositely arranged one or more drive coils. The magnetic induction intensity applied to the drive coils from the drive magnets can be increased and improved, and thus powerful lorentz force can be effectively generated by the drive coils after being electrified.

9 Claims, 8 Drawing Sheets

(51) Int. Cl.
  *G03B 5/06* (2006.01)
  *G02B 27/64* (2006.01)
  *H02K 41/035* (2006.01)
(52) U.S. Cl.
  CPC . *H02K 41/0356* (2013.01); *G03B 2205/0023* (2013.01); *G03B 2205/0069* (2013.01)
(58) Field of Classification Search
  CPC .... G03B 2205/0015; G03B 2205/0023; G03B 2205/0069; H02K 41/0356
  See application file for complete search history.

(56) References Cited

U.S. PATENT DOCUMENTS

| | | | | |
|---|---|---|---|---|
| 2009/0015948 A1* | 1/2009 | Wada | ................ | G02B 7/08 359/824 |
| 2014/0177056 A1* | 6/2014 | Hayashi | ................ | G02B 7/08 359/557 |
| 2014/0355118 A1* | 12/2014 | Park | ................ | G02B 27/646 359/557 |

* cited by examiner

LENS DRIVING DEVICE

BACKGROUND OF THE INVENTION

1. Field of the Invention

The present invention relates to a lens driving device used by a camera loaded in a mobile phone.

2. Description of Related Art

In recent years, mobile phones have various functions of internet communication, games and the like besides photographic function (cameras), so that the power consumption is increased. Moreover, in electromagnetic drive type lens driving device used for cameras, besides the function of auto focus, the structure with the function of shaking correction is also added, and the power consumption in the lens driving device is also increased.

PCT patent application publication NO. WO2010/043078A1, Pub. date of Apr. 22, 2010 discloses a lens driving device as shown in FIG. 6A to 6D. FIG. 6A is a perspective view of a lens driving device 30, FIG. 6B is an exploded view of the lens driving device 30, FIG. 6C is a perspective view of the main parts of an electromagnetic drive mechanism 31 in the lens driving device 30, and FIG. 6D is a schematic diagram illustrating the magnetic field generated by drive magnets 31M. Hereon, the optical axis direction of a lens 35 is set to be the Z axis direction (the object to be shot is at +Z side), and two directions forming right angles with Z axis and perpendicular to each other are set to be X axis direction and Y axis direction respectively. Moreover, in FIG. 6C, the aftermentioned +X side drive magnet 31MPX is partially illustrated through cutting so as to improve the visibility of the oppositely arranged +X side drive coil 31CPX.

The lens driving device 30 includes the functions of auto focus and shaking correction, so that the lens 35 moves along the Z axis direction, a shot image is focused in an unshown image sensor arranged at the back of the Z axis of the lens, and the lens 35 swings towards the X axis direction and the Y axis direction (for example, the lens 35 also swings towards the periphery of the axis parallel to the X axis and the periphery of the axis parallel to the Y axis respectively while rotating), so that the shot image in the image sensor is inhibited from shifting (camera shaking).

As shown in FIG. 6A, the lens driving device 30 is integrally formed in the shape of a cuboid, and the lens 35 is maintained at the central part of the lens driving device 30. As shown in FIG. 6B, the lens driving device 30 includes a lens support 32 for mounting the lens 35, two platelike spring components 34 for supporting the lens support 32 in a suspended manner to be capable of moving, an electromagnetic drive mechanism 31 composed of the drive coils 31C and the drive magnets 31M, and a square frame-shaped magnet support 33 for supporting the drive magnets 31M.

As shown in FIG. 6B and FIG. 6C, the drive coils 31C are composed of the following components: a +X side drive coil 31CPX which winds around the axis parallel to the X axis and is mounted on the +X side of the lens support 32, a −X side drive coil 31CMX which winds around the axis parallel to the X axis and is mounted on the −X side of the lens support 32, a +Y side drive coil 31CPY which winds around the axis parallel to the Y axis and is mounted on the +Y side of the lens support 32, and a −Y side drive coil 31CMY which winds around the axis parallel to the Y axis and is mounted on the −Y side of the lens support 32.

As shown in FIG. 6C, the drive magnets 31M are composed of the following components: a +X side drive magnet 31MPX which is mounted in the +X side square frame of the magnet support 33 and is isolated from the +X side drive coil 31CPX at an interval along the X axis direction and is arranged opposite to the +X side drive coil 31CPX, a −X side drive magnet 31MMX which is mounted in the −X side square frame of the magnet support 33 and is isolated from the −X side drive coil 31CMX at an interval along the X axis direction and is arranged opposite to the −X side drive coil 31CMX, a +Y side drive magnet 31MPY which is mounted in the +Y side square frame of the magnet support 33 and is isolated from the +Y side drive coil 31CPY at an interval along the Y axis direction and is arranged opposite to the +Y side drive coil 31CPY, and a −Y side drive magnet 31MMY which is mounted in the −Y side square frame of the magnet support 33 and is isolated from the −Y side drive coil 31CMY at an interval along the Y axis direction and is arranged opposite to the −Y side drive coil 31CMY.

The +X side drive magnet 31MPX, the −X side drive magnet 31MMX, the +Y side drive magnet 31MPY and the −Y side drive magnet 31MMY are respectively and completely cut into two parts: a cuboid-shaped +Z side magnet plate 31MA positioned in the +Z direction and a cuboid-shaped −Z side magnet plate 31MB positioned in the −Z direction.

The +X side drive coil 31CPX, the −X side drive coil 31CMX, the +Y side drive coil 31CPY and the −Y side drive coil 31CMY are respectively wound in the shapes of long circles, are arranged opposite to each other as a +Z side coil side 31CA and a +Z side magnet plate 31MA on one long side, and are arranged opposite to each other as a −Z side coil side 31CB and a −Z side magnet plate 31MB on the other long side.

The platelike spring component 34 is formed in the shape of a universal joint, and is composed of a +Z side platelike spring component 34F and a −Z side platelike spring component 34B. The inner diameter part 34a of the +Z side platelike spring component 34F is connected with the +Z side end part of the lens support 32, and the outer diameter part 34b of the +Z side platelike spring component 34F is connected with the +Z side end part of the magnet support 33. The inner diameter part 34a of the −Z side platelike spring component 34B is connected with the −Z side end part of the lens support 32, and the outer diameter part 34b of the −Z side platelike spring component 34B is connected with the −Z side end part of the magnet support 33. As a result, when the platelike spring components 34 straightly moves towards the Z axis direction, the platelike spring component 34 is used for supporting the lens support 32 in the suspended manner so that the lens support 32 rotates in the axis direction forming a right angle with the Z axis, and the platelike spring component 34 can swing along with the lens support 32.

As shown in FIG. 6C, the +Z side magnet plate 31MA and the −Z side magnet plate 31MB face the coil side 31CA and the coil side 31CB which are oppositely arranged.

Specifically, the +Z side magnet plate 31MA of the +X side drive magnet 31MPX faces the +Z side coil side 31CA of the +X side drive coil 31CPX, is magnetized along the X axis direction, so that the side of the +Z side coil side 31CA becomes an N pole. The −Z side magnet plate 31MB of the +X side drive magnet 31MPX faces the −Z side coil side 31CB of the +X side drive coil 31CPX, is reversely magnetized along the X axis direction, so that the side of the −Z side coil side 31CB becomes an S pole. The +Z side magnet plate 31MA of the −X side drive magnet 31MMX faces the +Z side coil side 31CA of the −X side drive coil 31CMX, is magnetized along the X axis direction, so that the side of the +Z side coil side 31CA becomes the N pole. The −Z side magnet plate 31MB of the −X side drive magnet 31MMX faces the −Z side coil side 31CB of the −X side drive coil 31CMX, is magnetized along the X axis direction, so that the side of the −Z side coil side 31CB becomes an S pole. The +Z side magnet plate 31MA of the +Y side drive magnet 31MPY faces the +Z side coil side 31CA of the +Y side drive coil 31CPY, is magnetized along the Y axis direction, so that the side of the +Z side coil side 31CA becomes the N pole. The −Z side magnet plate 31MB of the +Y side drive magnet 31MPY faces the −Z side coil side 31CB of the +Y side drive coil 31CPY, is magnetized along the Y axis direction, so that the side of the −Z side coil side 31CB becomes an S pole. The +Z side magnet plate 31MA of the −Y side drive magnet 31MMY faces the +Z side coil side 31CA of the −Y side drive coil 31CMY, is magnetized along the Y axis direction, so that the side of the +Z side coil side 31CA becomes the N pole. The −Z side magnet plate 31MB of the −Y side drive magnet 31MMY faces the −Z side coil side 31CB of the −Y side drive coil 31CMY, is magnetized along the Y axis direction, so that the side of the −Z side coil side 31CB becomes an S pole.

As mentioned above, the electromagnetic drive mechanism 31 is composed of the following four groups of components: an electromagnetic drive mechanism 31PX on the +X side composed of the +X side drive coil 31CPX and the +X side drive magnet 31MPX, an electromagnetic drive mechanism 31MX on the −X side composed of the −X side drive coil 31CMX and the −X side drive magnet 31MMX, an electromagnetic drive mechanism 31PY on the +Y side composed of the +Y side drive coil 31CPX and the +Y side drive magnet 31MPY, and an electromagnetic drive mechanism 31MY on the −Y side composed of the −Y side drive coil 31CMY and the −Y side drive magnet 31MMY.

As shown in FIG. 6D, the electromagnetic drive mechanism 31PX on the +X side and the electromagnetic drive mechanism 31MX on the −X side are open magnetic circuits composed of the +Z side magnet plate 31MA and the −Z side magnet plate 31MB which are adjacent along the Z axis direction, wherein the inner diameter side (the side of the +X side drive coil 31CPX and the −X side drive coil 31CMX in the figure) and the outer diameter side of the drive mechanism 31 are opened.

Namely, on the inner diameter side of the electromagnetic drive mechanism 31, magnetic induction lines sent from the +Z side magnet plate 31MA are expanded towards the inner diameter direction of the electromagnetic drive mechanism 31 and are crossed with the +Z side coil side 31CA, and then the direction of the magnetic induction lines is changed into the outer diameter direction of the electromagnetic drive mechanism 31, so that the magnetic induction lines are crossed with the −Z side coil side 31CB and are returned to the −Z side magnet plate 31MB. Moreover, on the outer diameter side of the electromagnetic drive mechanism 31, magnetic induction lines sent from the −Z side magnet plate 31MB to the outer diameter direction of the electromagnetic drive mechanism 31 are changed into the direction facing inner diameter, and are returned to the +Z side magnet plate 31MA. And then, in the electromagnetic drive mechanism 31PX on the +X side and the electromagnetic drive mechanism 31MX on the −X side, the magnetic induction intensity sent from the inner diameter side (the side of the +X side drive coil 31CPX and the −X side drive coil 31CMX) of the electromagnetic drive mechanism 31 and the magnetic induction intensity sent from the outer diameter side of the electromagnetic drive mechanism 31 are approximately same in degree.

For example, when current in the −X axis direction (anticlockwise direction in +X axis direction) flows in the +X side drive coil 31CPX in the electromagnetic drive mechanism 31PX on the +X side, lorentz force in the +Z axis direction is generated on the +Z side coil side 31CA of the +X side drive coil 31CPX, and lorentz force in the +Z axis direction is also generated on the −Z side coil side 31CB. Moreover, when current in the +X axis direction flows in the −X side drive coil 31CMX in the electromagnetic drive mechanism 31MX on the −X side, lorentz force in the +Z axis direction is generated on the +Z side coil side 31CA of the −X side drive coil 31CMX, and lorentz force in the +Z axis direction is also generated on the −Z side coil side 31CB.

Right now, if the current intensity when the +X side drive coil 31CPX is electrified is the same as the current intensity when the −X side drive coil 31CMX is electrified, the lens support 32 straightly moves towards the +Z axis direction; and if the current intensity when the +X side drive coil 31CPX is electrified is different from the current intensity when the −X side drive coil 31CMX is electrified, the lens support 32 straightly moves towards the +Z axis direction based on different electric quantities, and at the same time, the lens support 32 rotates and swings around the axis parallel to the Y axis (namely rotates and swings in the Y axis direction).

Similarly, when current in the −Y axis direction (anticlockwise direction in +Y axis direction) flows in the +Y side drive coil 31CPY in the electromagnetic drive mechanism 31PY on the +Y side, lorentz force in the +Z axis direction is generated on the +Z side coil side 31CA of the +Y side drive coil 31CPY, and lorentz force in the +Z axis direction is also generated on the −Z side coil side 31CB. Moreover, when current in the +Y axis direction flows in the −Y side drive coil 31CMY in the electromagnetic drive mechanism 31MY on the −Y side, lorentz force in the +Z axis direction is generated on the +Z side coil side 31CA of the −Y side drive coil 31CMY, and lorentz force in the +Z axis direction is also generated on the −Z side coil side 31CB.

Right now, if the current intensity when the +Y side drive coil 31CPY is electrified is the same as the current intensity when the −Y side drive coil 31CMY is electrified, the lens support 32 straightly moves towards the +Z axis direction; and if the if the current intensity when the +Y side drive coil 31CPY is electrified is different from the current intensity when the −Y side drive coil 31CMY is electrified, the lens support 32 straightly moves towards the +Z axis direction based on different electric quantities, and at the same time, the lens support 32 rotates and swings around the axis parallel to the X axis (namely rotates and swings in the X axis direction).

In this way, the electromagnetic drive mechanism 31 can start the functions of auto focus and shaking correction at the same time, so that the lens 34 maintained on the lens support 32 straightly moves towards the Z axis direction, and rotates and swings in the direction forming the right angle with the Z axis.

However, in the electromagnetic drive mechanism 31 formed as mentioned above, the efficiency of applying magnetic force is relatively low, and thus a magnetic field cannot be applied for the drive coils 31C sufficiently. Moreover, as mentioned above, the electromagnetic drive mechanism 31 needs to carry out the operation of the two functions of auto focus (the lens 35 moves along the Z axis direction) and shaking correction (the lens 35 swings in the X axis direction and the Y axis direction), so that the power consumption is increased compared with a lens driving device with the function of auto focus only. Therefore, the operation of the electromagnetic drive mechanism 31 during the shooting of the camera needs a large amount of electric power, so that the problem that the consumption time of a rechargeable battery loaded in a mobile phone becomes short appears. Therefore, an electromagnetic drive mechanism with low power consumption is needed.

BRIEF SUMMARY OF THE INVENTION

The present invention aims to provide a lens driving device with auto focus and shaking correction function and having low power consumption, the driving efficiency of an electromagnetic drive mechanism is improved.

A lens driving device includes includes: one or mores drive coils having one or more forward path sides and one or more return path sides, and drive magnets each having a forward path side magnet plate and a return path side magnet plate. Each forward path side magnet plate is isolated from a corresponding one of the one or more forward path sides at an interval and is arranged opposite to the corresponding one of the one or more forward path sides. Each return path side magnet plate is isolated from a corresponding one of the one or more return path sides at an interval and is arranged opposite to the corresponding one of the one or more return path sides. The forward path side magnet plate and the return path side magnet plate of each drive magnets are magnetized respectively along different directions. The magnetization directions of the forward path side magnet plate and the return path side magnet plate of each drive magnets define an angle which is expanded towards the oppositely arranged one or more drive coils.

Thus, the magnetic induction intensity applied to the drive coils from the drive magnets can be increased and improved, and thus powerful lorentz force can be effectively generated by the drive coils after being electrified.

Moreover, as an embodiment of the present invention, there are several drive coils each is wound along a direction forming a right angle with an optical axis of a lens driven by the lens driving device, and each drive coil faces to and is isolated at an interval with a magnetic pole face of a corresponding one of the plurality of drive magnets along the direction forming the right angle with the optical axis.

Thus, the lens straightly moves towards the direction of the optical axis, and the lens swings towards the direction forming the right angle with the optical axis, so that the two functions of auto focus and shaking correction can be efficiently started.

Moreover, as another embodiment of the present invention, there are two drive coils wound around a direction parallel to an optical axis of a lens driven by the lens driving device. The forward path side magnet plate of each drive magnet is configured opposite to and isolated at an intervals with a magnetic pole face of one of the two drive coils along a direction forming a right angle with the optical axis of the lens, and the return path side magnet plate of each drive magnet is configured opposite to and isolated at an intervals with a magnetic pole face of the other one of the two drive coils along the direction forming a right angle with the optical axis of the lens.

Thus, the lens straightly moves towards the direction of the optical axis, so that auto focus can be performed efficiently.

Moreover, as further another embodiment of the present invention, there are several drive coils each wound around a direction parallel to an optical axis of a lens driven by the lens driving device, and each drive coil faces to and is isolated at an interval with a magnetic pole face of a corresponding one of the plurality of drive magnets along the direction parallel to the optical axis.

Thus, the lens swings towards the direction forming the right angle with the optical axis, so that shaking correction can be performed efficiently.

Moreover, as an embodiment of the present invention, there are a plurality of drive coils each wound around a direction parallel to an optical axis of a lens driven by the lens driving device, and each drive coil faces to and is isolated at an interval with a side face of a corresponding one of the plurality of drive magnets along the direction parallel to the optical axis; the side face of each drive magnet is adjacent with its magnetic pole face.

Thus, the lens swings towards the direction forming the right angle with the optical axis, so that the operation of shaking correction can be performed efficiently.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1A:
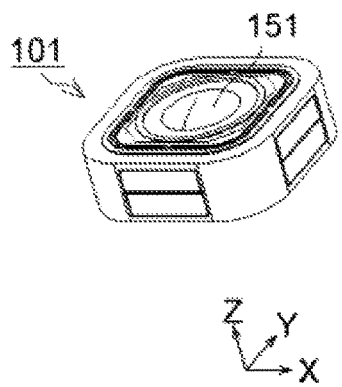
FIG. 1A is a perspective view of a lens driving device in accordance with a first embodiment of the present invention.
Figure 1B:
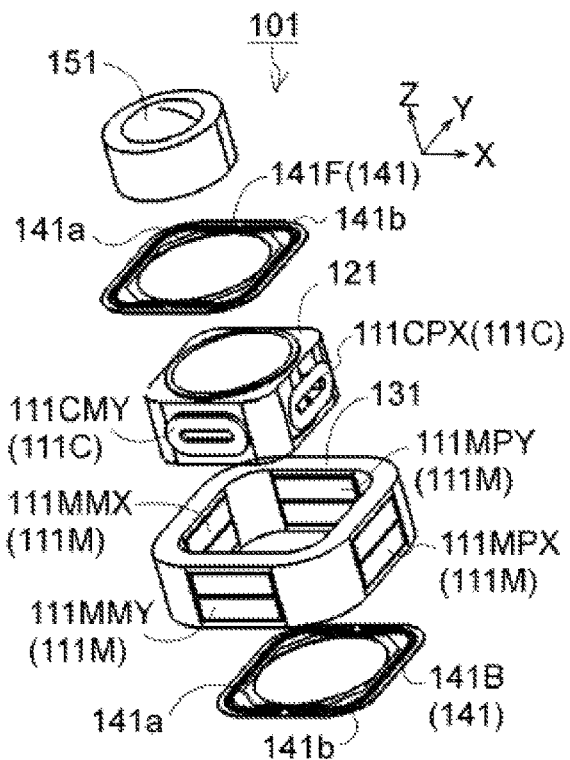
FIG. 1B is an exploded view of the lens driving device of FIG. 1A.
Figure 1C:
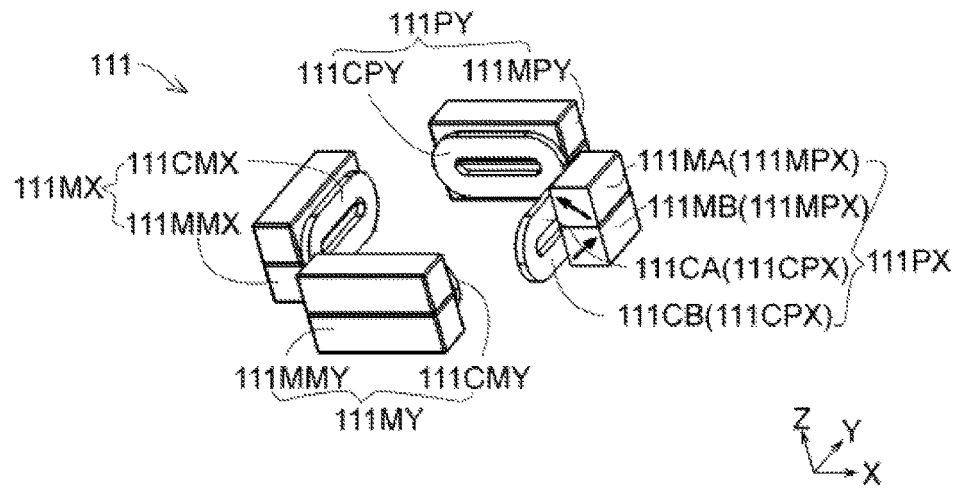
FIG. 1C is a perspective view of the main parts of an electromagnetic drive mechanism of the lens driving device of FIG. 1A.
Figure 2A:
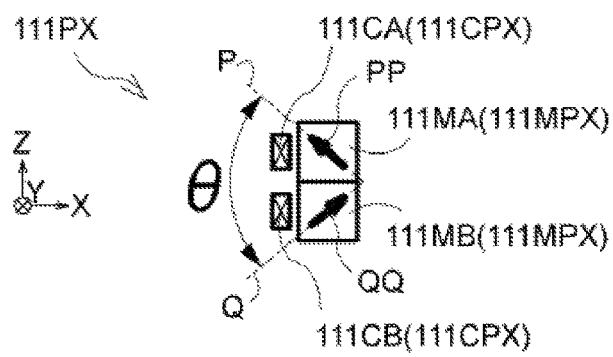
FIG. 2A is a schematic diagram illustrating the relationship of magnetization directions of the magnets and the coils of the lens driving device in the first embodiment.
Figure 2B:
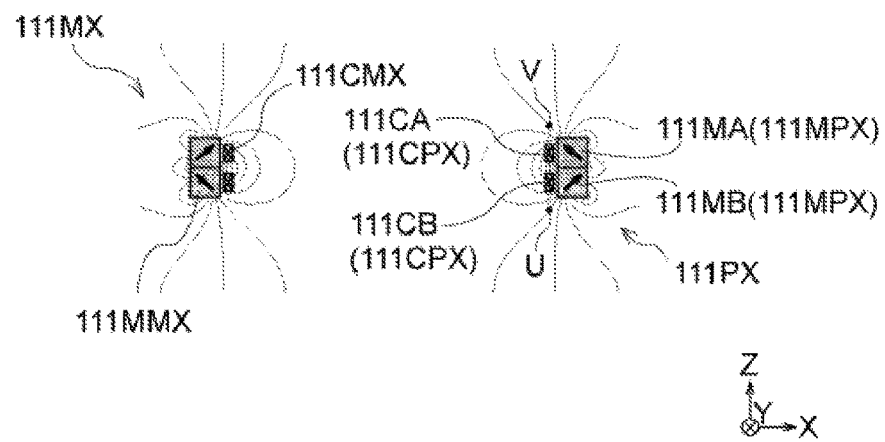
FIG. 2B is a schematic diagram illustrating a magnetic field generated by the magnets of the lens driving device in the first embodiment.
Figure 2C:
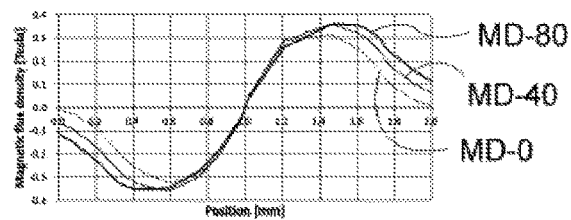
FIG. 2C is a curve graph illustrating the magnetic induction intensity crossed with the drive coils in FIG. 2A.

FIG. 1A is a perspective view of a lens driving device 101 in the first embodiment of the present invention. FIG. 1B is an exploded view of the lens driving device 101. FIG. 1C is a perspective view of an electromagnetic drive mechanism 111 in the lens driving device 101. Moreover, FIG. 2A is a schematic diagram illustrating the magnetization of the magnets 111M used in the electromagnetic drive mechanism 111, FIG. 2B is a schematic diagram illustrating the dispersion of a magnetic field generated by the drive magnets 111M, and FIG. 2C is a curve graph illustrating the magnetic induction intensity crossed with the drive coils 111C. Hereon, the optical axis direction of a lens 151 is set to be the Z axis direction (an object to be shot is at +Z side of the Z axis direction), and two directions forming right angles with Z axis and perpendicular with each other are set to be X axis direction and Y axis direction. Moreover, in FIG. 1C, the +X side drive magnet 111MPX is partially illustrated through cutting so as to improve the visibility of the oppositely arranged +X side drive coil 111CPX.

The lens driving device 101 has the functions of auto focus and shaking correction, so that the lens 151 can move in the Z axis direction efficiently, a shot image is focused in an unshown image sensor arranged at the back of the Z axis of the lens 151, and the lens 151 can efficiently swing towards the X axis direction and the Y axis direction respectively (in the first embodiment, the lens 35 swings while rotating around the periphery of the axis parallel to the X axis and the periphery of the axis parallel to the Y axis respectively), so that the shot image in the image sensor is inhibited from shifting (mobile phone shaking).

As shown in FIG. 1A, the lens driving device 101 is integrally formed in the shape of a cuboid, and the lens 151 can be maintained at the central part of the lens driving device 30. As shown in FIG. 1B, the lens driving device 101 includes a lens support 121 for mounting the lens 151, two platelike spring components 141 for supporting the lens support 121 in a suspended manner to be capable of moving along the optical axis direction of a lens 151, an electromagnetic drive mechanism 111 including four drive coils 111C and four drive magnets 111M, and a square frame-shaped magnet support 131 for supporting the drive magnets 111M.

The drive coils 111C are composed of the following components: a +X side drive coil 111CPX which winds around the axis parallel to the X axis and is mounted on the +X side of the lens support 121, a −X side drive coil 111CMX which winds around the axis parallel to the X axis and is mounted on the −X side of the lens support 121, a +Y side drive coil 111CPY which winds around the axis parallel to the Y axis and is mounted on the +Y side of the lens support 121, and a −Y side drive coil 111CMY which winds around the axis parallel to the Y axis and is mounted on the −Y side of the lens support 121.

As shown in FIG. 1C, the drive magnets 111M are composed of the following components: a +X side drive magnet 111MPX which is mounted in a +X side square frame of the magnet support 131 and is isolated from the +X side drive coil 111CPX at an interval along the X axis direction and is arranged opposite to the +X side drive coil 111CPX, a −X side drive magnet 111MMX which is mounted in a −X side square frame of the magnet support 131 and is isolated from the −X side drive coil 111CMX at an interval along the X axis direction and is arranged opposite to the −X side drive coil 111CMX, a +Y side drive magnet 111MPY which is mounted in a +Y side square frame of the magnet support 131 and is isolated from the +Y side drive coil 111CPY at an interval along the Y axis direction and is arranged opposite to the +Y side drive coil 111CPY, and a −Y side drive magnet 111MMY which is mounted in a −Y side square frame of the magnet support 131 and is isolated from the −Y side drive coil 111CMY at an interval along the Y axis direction and is arranged opposite to the −Y side drive coil 111CMY.

The +X side drive magnet 111MPX, the −X side drive magnet 111MMX, the +Y side drive magnet 111MPY and the −Y side drive magnet 111MMY are completely formed to be the shapes of cuboids when viewed form the sides of +Z direction, and each is cut/divided into a +Z side magnet plate 111MA as a forward path side magnet plate and a −Z side magnet plate 111MB as a return path side magnet plate. The +Z side magnet plate 111MA and the −Z side magnet plate 111MB are stacked together in the Z axis direction (the +Z side magnet plate 111MA is at the +Z side, and the −Z side magnet plate 111MB is at the −Z side). The forward path side refers to the side where the magnetic field lines are sent out from the +Z side magnet plate 111MA and crossed with a +Z side of the drive coil. The return path side refers to the side where the magnetic field lines turn round and crossed with the −Z side of the drive coil and then go back the −Z side magnet plate 111MB.

Each of the +X side drive coil 111CPX, the −X side drive coil 111CMX, the +Y side drive coil 111CPY and the −Y side drive coil 111CMY for forming the drive coil 111C is wound in a shape of a long circle which has two parallel long sides and two short circular arc sides connecting the ends of the long sides. The +Z side coil side 111CA as one long side of the drive coil 111C is at the forward path side, and is arranged opposite to the +Z side magnet plate 111MA. Moreover, the −Z side coil side 111CB as the other long side of the drive coil 111C is at the return path side, and is arranged opposite to the −Z side magnet plate 111MB.

The platelike spring components 141 are formed in the shapes of universal joints, and are composed of a +Z side platelike spring component 141F and a −Z side platelike spring component 141B. The inner diameter part 141*a* of the +Z side platelike spring component 141F is connected with the +Z side end part of the lens support 121, and the outer diameter part 141*b* of the +Z side platelike spring component 141F is connected with the +Z side end part of the magnet support 131. The inner diameter part 141*a* of the −Z side platelike spring component 141B is connected with the −Z side end part of the lens support 121, and the outer diameter part 141*b* of the −Z side platelike spring component 141B is connected with the −Z side end part of the magnet support 131. The platelike spring component 141 is used for supporting the lens support 121 in the suspended manner so that the lens support 121 can rotate and swing in a axis direction forming a right angle with the Z axis when the lens support 121 straightly moves towards the Z axis direction.

As shown in FIG. 2A, the +Z side magnet plate 111MA of the +X side drive magnet 111MPX and the +Z side coil side 111CA of the +X side drive coil 111CPX are arranged opposite to each other along the X axis direction. The −Z side magnet plate 111MB of the +X side drive magnet 111MPX and the −Z side coil side 111CB of the +X side drive coil 111CPX are arranged opposite to each other along the X axis direction. When viewed from a plane including the X axis and the Z axis, the +Z side magnet plate 111MA is magnetized along a P axis direction which is inclined from the X axis (that is, inclined in relative to the X axis) and as shown in an arrow PP, and an N pole is formed on the side of the +Z side coil side 111CA. When viewed from a plane including the X axis and the Z axis, the −Z side magnet plate 111MB is magnetized along a Q axis direction which is inclined from the X axis (that is, inclined in relative to the X axis) and as shown in an arrow QQ, and an S pole is formed on the side of the −Z side coil side 111CB. In other words, the magnetization direction of the +Z side magnet plate 111MA and the magnetization direction of the −Z side magnet plate 111MB are mutually different directions, and the two magnet plates are magnetized slantly in the P axis direction and the Q axis direction respectively, so that an expansion angle θ is defined by the magnetization directions of the +Z side magnet plate 111MA and the −Z side magnet plate 111MB. The expansion direction of the expansion angle θ is towards the width direction (in the Z axis direction) of the drive coil whose +Z side coil side 111CA and the −Z side coil side 111CB are oppositely arranged with the +Z side magnet plate 111MA and the −Z side magnet plate 111MB, respectively. Namely, the expansion angle θ defined by the magnetization directions of the +Z side magnet plate 111MA and the −Z side magnet plate 111MB is expanded (widened) towards the +Z side coil side 111CA and the −Z side coil side 111CB which are arranged opposite to the magnet plates 111MA and 111MB mutually.

Graphical expression is omitted, similar to the above description, the +Z side magnet plate 111MA of the −X side drive magnet 111MMX is magnetized slantly towards the width direction of the +Z side coil side 111CA of the −X side drive coil 111CMX (that is, slant from the +X axis towards the +Z axis), so that the N pole is formed on the side of the +Z side coil side 111CA. The −Z side magnet plate 111MB of the −X side drive magnet 111MMX is magnetized slantly towards the width direction of the −Z side coil side 111CB of the −X side drive coil 111CMX (that is, slant from the +X axis towards the −Z axis), so that the S pole is formed on the side of the −Z side coil side 111CB. The +Z side magnet plate 111MA of the +Y side drive magnet 111MPY is magnetized slantly in the width direction of the +Z side coil side 111CA of the +Y side drive coil 111CPY, so that the N pole is formed on the side of the +Z side coil side 111CA. The −Z side magnet plate 111MB of the +Y side drive magnet 111MPY is magnetized slantly in the width direction of the −Z side coil side 111CB of the +Y side drive coil 111CPY, so that the S pole is formed on the side of the −Z side coil side 111CB. The +Z side magnet plate 111MA of the −Y side drive magnet 111MMY is magnetized slantly in the width direction of the +Z side coil side 111CA of the −Y side drive coil 111CMY, so that the N pole is formed on the side of the +Z side coil side 111CA. The −Z side magnet plate 111MB of the −Y side drive magnet 111MMY is magnetized slantly in the width direction of the −Z side coil side 111CB of the −Y side drive coil 111CMY, so that the S pole is formed on the side of the −Z side coil side 111CB.

As mentioned above, the electromagnetic drive mechanism 111 includes the following four groups of electromagnetic drive mechanisms: the electromagnetic drive mechanism 111PX on the +X side composed of the +X side drive coil 111CPX and the +X side drive magnet 111MPX, the electromagnetic drive mechanism 111MX on the −X side composed of the −X side drive coil 111CMX and the −X side drive magnet 111MMX, the electromagnetic drive mechanism 111PY on the +X side composed of the +Y side drive coil 111CPY and the +Y side drive magnet 111MPY, and the electromagnetic drive mechanism 111MY on the −Y side composed of the −Y side drive coil 111CMY and the −Y side drive magnet 111MMY.

The distribution state of magnetic induction lines in the electromagnetic drive mechanism 111PX on the +X side and the electromagnetic drive mechanism 111MX on the −X side of the electromagnetic drive mechanism 111 is expressed as a magnetic figure, and is as shown in FIG. 2B. As shown in FIG. 2B, the electromagnetic drive mechanism 111PX on the +X side and the electromagnetic drive mechanism 111MX on the −X side are open magnetic circuits composed of the +Z side magnet plate 111MA and the −Z side magnet plate 111MB which are adjacent along the Z axis direction, the inner diameter side (the side of the +X side drive coil 111CPX and the −X side drive coil 111CMX) and the outer diameter side of the drive mechanism 111 are opened.

Namely, on the inner diameter side of the electromagnetic drive mechanism 111, the magnetic induction lines sent from the +Z side magnet plate 111MA are expanded towards the inner side of the electromagnetic drive mechanism 111 and are crossed with the +Z side coil side 111CA; and then after the direction of the magnetic induction lines is changed into the outer diameter direction of the electromagnetic drive mechanism 111, the magnetic induction lines are crossed with the −Z side coil side 111CB and are returned to the −Z side magnet plate 111MB. Moreover, on the outer diameter side of the electromagnetic drive mechanism 111, the magnetic induction lines sent from the −Z side magnet plate 111MB to the outer diameter direction of the electromagnetic drive mechanism 111 are returned to the +Z side magnet plate 111MA. Hereon, the +Z side magnet plate 111MA and the −Z side magnet plate 111MB are magnetized slantly in the P axis direction and the Q axis direction respectively, and the expansion angle theta (θ) is formed. Thus, in the electromagnetic drive mechanism 111PX on the +X side and the electromagnetic drive mechanism 111MX on the −X side, the magnetic induction intensity sent towards the inner diameter side (the side of the +X side drive coil 111CPX and the −X side drive coil 111CMX) of the electromagnetic drive mechanism 111 is improved, and the amount of magnetic induction lines crossed with the +Z side coil side 111CA and the −Z side coil side 111CB respectively is increased.

The driving force generated by the +X side drive coil 111CPX and the −X side drive coil 111CMX as shown in FIG. 2B depends on the intensity of the lorentz force in the Z axis direction generated by the currents flowing in the +Z side coil side 111CA and the −Z side coil side 111CB located in the magnetic field along the Y axis direction. Namely, the driving efficiency of the electromagnetic drive mechanism 111PX on the +X side and the electromagnetic drive mechanism 111MX on the −X side depends on the size/amount of the crossed X axis direction component of the magnetic induction intensity.

In FIG. 2C, the X axis direction components of the magnetic induction intensity when the expansion angle theta is 0 degree, 40 degrees and 80 degrees respectively are illustrated in a curve manner in the area the magnetic field lines crossed with the +Z side coil side 111CA and the −Z side coil side 111CB respectively (between the point U and the point V in the FIG. 2B). The dotted line (MD-0) in the figure illustrates the magnetic induction intensity when the magnetization direction is not expanded, namely the expansion angle is 0 degree (in other words, the drive magnet 31MPX of the electromagnetic drive mechanism 31 based on the prior art is magnetized along the X axis direction), and the fine line (MD-40) illustrates the magnetic induction intensity when the expansion angle theta is 40 degrees, and the heavy line (MD-80) illustrates the magnetic induction intensity when the expansion angle theta is 80 degrees.

It is clear that the magnetization directions of the +Z side magnet plate 111MA and the −Z side magnet plate 111MB are expanded facing the +X side drive coil 111CPX or the −X side drive coil 111CMX which is oppositely arranged, so that the magnetic induction intensity crossed with the +X side drive coil 111CPX and the −X side drive coil 111CMX respectively can be improved, and the lorentz force generated by utilizing the currents flowing in these drive coils is improved, so that the driving efficiency of the electromagnetic drive mechanism 111PX on the +X side and the electromagnetic drive mechanism 111MX on the −X side can be improved.

Similarly, in the electromagnetic drive mechanism 111PY on the +Y side and the electromagnetic drive mechanism 111MY on the −Y side, the magnetization directions of the +Z side magnet plate 111MA and the −Z side magnet plate 111MB are expanded respectively relative to the +Y side drive coil 111CPY and the −Y side drive coil 111CMY which are oppositely arranged, so that the magnetic induction intensity crossed with the +Y side drive coil 111CPY and the −Y side drive coil 111CMY respectively can also be improved, and thus the driving efficiency of the electromagnetic drive mechanism 111 is integrally improved.

Namely, when current in the −X axis direction (anticlockwise direction in +X axis direction) flows in the +X side drive coil 111CPX in the electromagnetic drive mechanism 111PX on the +X side, lorentz force in the +Z axis direction is generated on the +Z side coil side 111CA of the +X side drive coil 111CPX, and lorentz force in the +Z axis direction is also generated on the −Z side coil side 111CB. Moreover, when current in the +X axis direction (clockwise direction in +X axis direction) flows in the −X side drive coil 111CMX in the electromagnetic drive mechanism 111MX on the −X side, lorentz force in the +Z axis direction is generated on the +Z side coil side 111CA of the −X side drive coil 111CMX, and lorentz force in the +Z axis direction is also generated on the −Z side coil side 111CB.

Right now, if the sizes of the current electrified to the +X side drive coil 111CPX and the −X side drive coil 111CMX are the same, the lens support 12 straightly moves towards the +Z axis direction. On the other hand, if the sizes of the currents are different, the lens support 121 straightly moves towards the +Z axis direction, and meanwhile the lens support 121 also rotates and swings around the axis parallel to the Y axis (namely rotates and swings in the Y axis direction) based on the different amount of the currents.

Similarly, when current in the −Y axis direction (anticlockwise direction in +Y axis direction) flows in the +Y side drive coil 111CPY in the electromagnetic drive mechanism 111PY on the +Y side, lorentz force in the +Z axis direction is generated on the +Z side coil side 111CA of the +Y side drive coil 111CPY, and lorentz force in the +Z axis direction is also generated on the −Z side coil side 111CB. Moreover, when current in the +Y axis direction (clockwise direction in +Y axis direction) flows in the −Y side drive coil 111CMY in the electromagnetic drive mechanism 111MY on the −Y side, lorentz force in the +Z axis direction is generated on the +Z side coil side 111CA of the −Y side drive coil 111CMY, and lorentz force in the +Z axis direction is also generated on the −Z side coil side 111CB.

Right now, if the size of the current flowing in the +Y side drive coil 111CPY is the same as the size of the current flowing in the −Y side drive coil 111CMY, the lens support 121 straightly moves towards the +Z axis direction; and if the if the sizes of the currents are different, the lens support 32 straightly moves towards the +Z axis direction, and at the same time, the lens support 32 rotates and swings around the axis parallel to the X axis (namely rotates and swings in the X axis direction) based on different electric quantities.

In this way, the electromagnetic drive mechanism 111 can play the roles of auto focus and shaking correction effectively at the same time, so that the lens 151 maintained on the lens support 121 efficiently and straightly moves towards the Z axis direction, and rotates and swings in the direction forming the right angle with the Z axis.

Figure 3A:
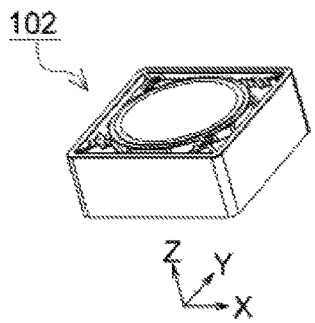
FIG. 3A is a perspective view of a lens driving device in accordance with a second embodiment of the present invention.
Figure 3B:
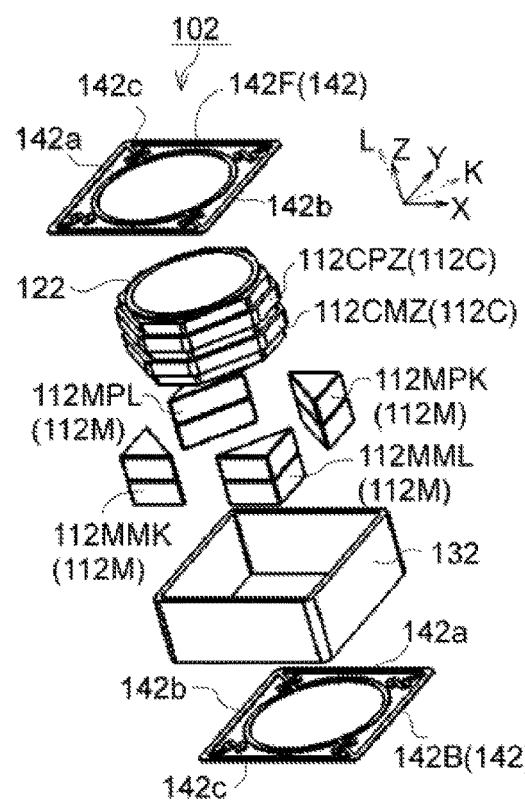
FIG. 3B is an exploded view of the lens driving device of FIG. 3A.
Figure 3C:
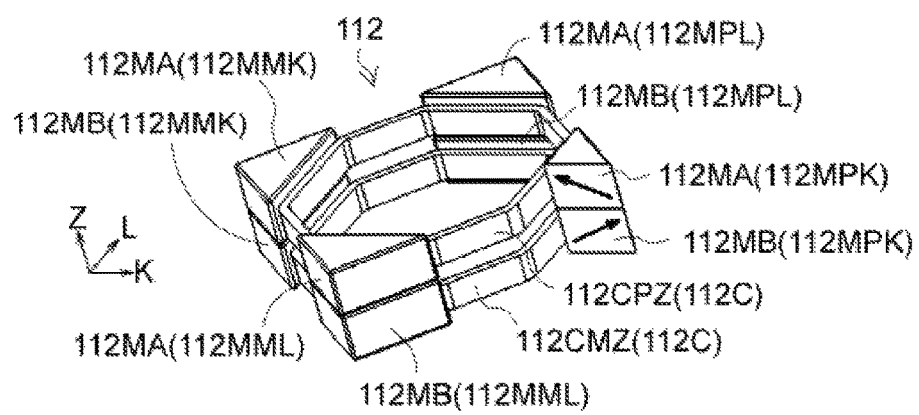
FIG. 3C is a perspective view of the main parts of an electromagnetic drive mechanism of the lens driving device in the second embodiment of the present invention.

FIG. 3A is a perspective view of the lens driving device 102 in the second embodiment of the present invention, FIG. 3B is an exploded view of the lens driving device 102, and FIG. 3C is a perspective view of an electromagnetic drive mechanism 112 in the lens driving device 102. Hereon, similar to the first embodiment, the optical axis direction of the lens (unshown) is set to be the Z axis direction (the object to be shot is at the +Z side), the two directions forming the right angles with the Z axis and perpendicular with each other are set to be the X axis direction and the Y axis direction respectively. Further more, a coordinate axis which is set by rotating the X axis direction towards the +Y axis direction around +Z axis (in other words, rotating the X axis around Z axis by +45 degrees) by 45 degrees is set to be K axis, and a coordinate axis which is set by rotating the Y axis direction towards the −X axis direction by 45 degrees around +Z axis (in other words, rotating the Y axis around Z axis by +45 degrees) is set to be L axis. Moreover, in FIG. 3C, the +X side drive magnet 112MPK is partially illustrated through cutting so as to improve the visibility of the +Z side drive coil 112CPZ and the −Z side drive coil 112CMZ which are oppositely arranged.

The lens driving device 102 has the function of auto focus, and can enable the lens to efficiently move towards the Z axis direction, so that the shot image is focused in the unshown image sensor.

As shown in FIG. 3A, the lens driving device 102 is integrally formed in the shape of a cuboid. The lens driving device 102 includes a lens support 122 for mounting the lens 151 of which the unshown lens is maintained at the central part, two platelike spring components 142 for supporting the lens support 122 in the suspended manner to be capable of moving in the Z axis direction, an electromagnetic drive mechanism 112 composed of the drive coils 112C and the drive magnets 112M, and a square frame-shaped magnet support 132 for supporting the drive magnets 112M.

The drive coils 112C include the +Z side drive coil 112CPZ and the −Z side drive coil 112CMZ. The +Z side drive coil 112CPZ is wound around the axis parallel to the Z axis along the outer diameter part of the lens support 122 formed in the shape of an octagonal barrel and is mounted on the +Z side as the forward path side. The −Z side drive coil 112CMZ is wound along the outer diameter part of the lens support 122 and is mounted on the −Z side as the return path side.

Each platelike spring component 142 includes the +Z side platelike spring component 142F and the −Z side platelike spring component 142B. Both of the +Z side platelike spring component 142F and the −Z side platelike spring component 142B include an inner diameter part 142a, an outer diameter part 142b, four the wrist parts 142c each repeatedly extends in the peripheral direction and the diameter direction and connects the inner diameter part 142a and the outer diameter part 142b. The inner diameter part 142a of the +Z side platelike spring component 142F is connected with the +Z side end part of the lens support 122, and the outer diameter part 142b of the +Z side platelike spring component 142F is connected with the +Z side end part of the magnet support 132. The inner diameter part 142a of the −Z side platelike spring component 142B is connected with the −Z side end part of the lens support 122, and the outer diameter part 142b of the −Z side platelike spring component 142B is connected with the −Z side end part of the magnet support 132. The spring component 142 is used for supporting the lens support 122 to be capable of moving in the Z axis direction in the suspended mode.

As shown in FIG. 3C, the drive magnets 112M include a +K side drive magnet 112MPK mounted at the +K side corner part of the magnet support 132, a −K side drive magnet 112MMK mounted at the −K side corner part of the magnet support 132, a +L side drive magnet 112MPL mounted at the +L side corner part of the magnet support 132, and a −L side drive magnet 112MML mounted at the −L side corner part of the magnet support 132.

The +K side drive magnet 112MPK, the −K side drive magnet 112MMK, the +L side drive magnet 112MPL and the −L side drive magnet 112MML are formed in the shapes of triangular prisms adjacent with one another around the Z direction respectively, and each is cut into a +Z side magnet plate 112MA as the forward path side magnet plate and a −Z side magnet plate 112MB as the return path side magnet plate respectively. That is, when viewed in the optical axis of the lens, each of the +K side drive magnet 112MPK, the −K side drive magnet 112MMK, the +L side drive magnet 112MPL and the −L side drive magnet 112MML is looked as a right triangle, and the hypotenuse of the right triangle faces to the drive coils 112C.

The +Z side drive coil 112CPZ as the forward path side and the +Z side magnet plate 112MA are isolated at an interval and are arranged opposite to each other in the radial direction, and the −Z side drive coil 112CMZ as the return path side and the −Z side magnet plate 112MB are isolated at an interval and are arranged opposite to each other in the radial direction.

When viewed from a plane including the K axis and the Z axis, the +Z side magnet plate 112MA in the +K side drive magnet 112MPK is magnetized slantly along a direction inclined from the K axis, so that the N pole is formed on the side of the +Z side drive coil 112CPZ. When viewed from a plane including the K axis and the Z axis, the −Z side magnet plate 112MB is magnetized slantly along a direction inclined from the K axis, so that the S pole is formed on the side of the −Z side drive coil 112CMZ. Namely, the +Z side magnet plate 112MA and the −Z side magnet plate 112MB are magnetized slantly in the manner that an intersection angle of the magnetization directions of the +Z side magnet plate 112MA and the −Z side magnet plate 112B is expanded at a certain angle towards the +Z side drive coil 112CPZ and the −Z side drive coil 112CMZ which are arranged opposite to each other.

Similarly, when viewed from a plane including the K axis and the Z axis, the +Z side magnet plate 112MA in the −K side drive magnet 112MMK is magnetized slantly in a direction inclined from the K axis, so that the N pole is formed on the side of the +Z side drive coil 112CPZ; and the −Z side magnet plate 112MB is magnetized slantly in a direction inclined from the K axis, so that the S pole is formed on the side of the −Z side drive coil 112CMZ. Moreover, when viewed from a plane including the Z axis and the L axis, the +Z side magnet plate 112MA in the +L side drive magnet 112MPL is magnetized slantly in a direction inclined from the L axis, so that the N pole is formed on the side of the +Z side drive coil 112CPZ; and the −Z side magnet plate 112MB is magnetized slantly in a direction inclined from the L axis, so that the S pole is formed on the side of the −Z side drive coil 112CMZ. When viewed from a plane including the Z axis and the L axis, the +Z side magnet plate 112MA in the −L side drive magnet 112MML is magnetized slantly in a direction inclined from the L axis, so that the N pole is formed on the side of the +Z side drive coil 112CPZ; and the −Z side magnet plate 112MB is magnetized slantly in a direction inclined from the L axis, so that the S pole is formed on the side of the −Z side drive coil 112CMZ.

As mentioned above, the electromagnetic drive mechanism 112 includes the +Z side drive coil 112CPZ and the −Z side drive coil 112CMZ, the +K side drive magnet 112MPK, the −K side drive magnet 112MMK, the +L side drive magnet 112MPL and the −L side drive magnet 112MML.

In the second embodiment, the +Z side magnet plate 112MA and the −Z side magnet plate 112MB are magnetized slantly in the manner that the magnetization directions of the +Z side magnet plate 112MA and the −Z side magnet plate 112MB form a certain expanded angle towards a winding width direction (in the Z axis direction) of the +Z side drive coil 112CPZ and the −Z side drive coil 112CMZ. And then, on the inner diameter side of the electromagnetic drive mechanism 112, the magnetic induction lines sent from the +Z side magnet plate 112MA are expanded towards the inner side of the electromagnetic drive mechanism 112 and are crossed with the +Z side drive coil 112CPZ; and after the magnetic induction lines are changed in the outer diameter direction of the electromagnetic drive mechanism 112, the magnetic induction lines are crossed with the −Z side drive coil 112CMZ and are returned to the −Z side magnet plate 112MB. Moreover, on the outer diameter side of the electromagnetic drive mechanism 112, the magnetic induction lines sent from the −Z side magnet plate 112MB to the outer diameter direction of the electromagnetic drive mechanism 112 are returned to the +Z side magnet plate 112MA. Therefore, the magnetic induction intensity sent to the side of the +Z side drive coil 112CPZ and the −Z side drive coil 112CMZ of the electromagnetic drive mechanism 112 can be improved, and the amount of magnetic induction lines crossed with the +Z side drive coil 112CPZ and the −Z side drive coil 112CMZ respectively is increased.

As a result, the lorentz force generated by utilizing the current flowing in the +Z side drive coil 112CPZ and the −Z side drive coil 112CMZ is improved, and the driving efficiency of the electromagnetic drive mechanism 112 can be improved.

Thus, in the lens driving device 102 in the second embodiment, the electromagnetic drive mechanism 112 can also utilize strong driving force, so that the lens maintained on the lens support 122 can efficiently and straightly move towards the Z axis direction.

Figure 4A:
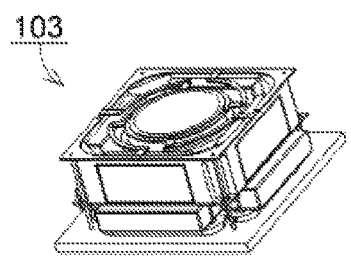
FIG. 4A is a perspective view of a lens driving device in accordance with a third embodiment of the present invention.
Figure 4B:
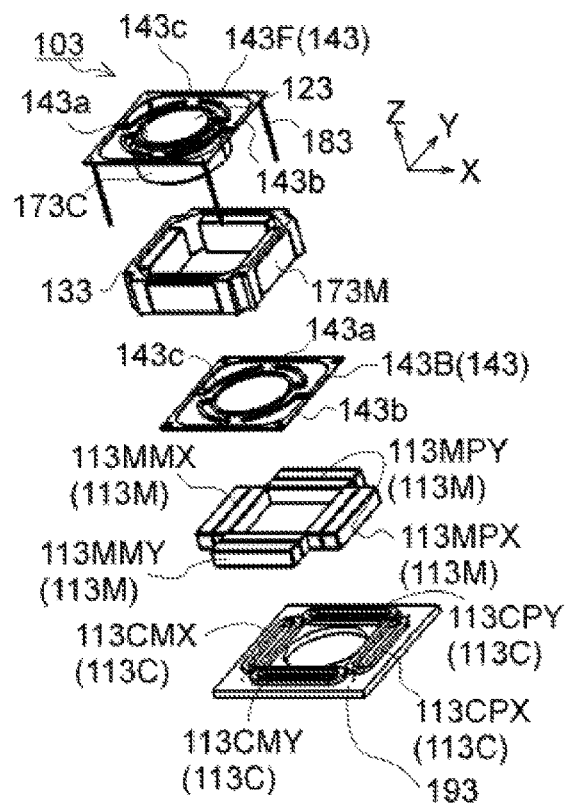
FIG. 4B is an exploded view of the lens driving device of FIG. 4A.
Figure 4C:
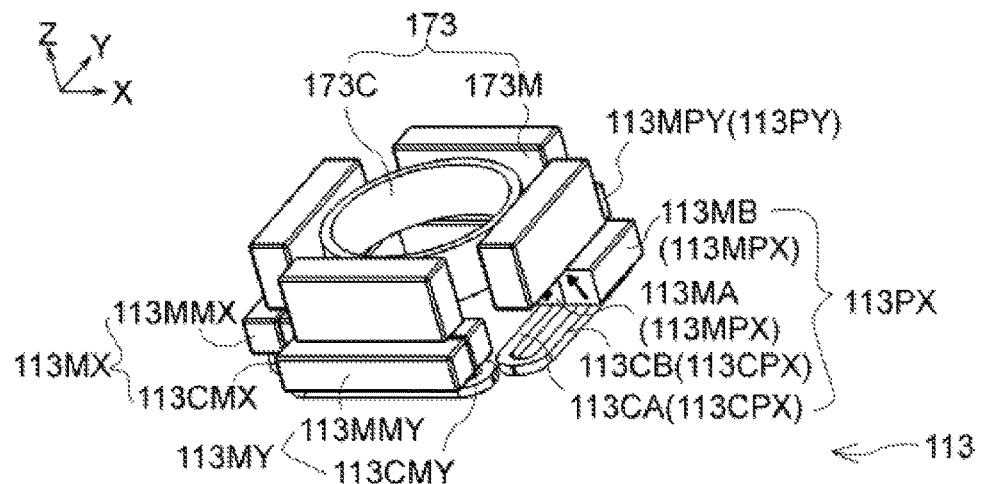
FIG. 4C is a perspective view of the main parts of an electromagnetic drive mechanism of the lens driving device in the third embodiment of the present invention.

FIG. 4A is a perspective view of the lens driving device 103 in the third embodiment of the present invention, FIG. 4B is an exploded view of the lens driving device 103, and FIG. 4C is perspective views of an electromagnetic drive mechanism 113 for shaking correction and an electromagnetic drive mechanism 173 for focus in the lens driving device 103. Moreover, in FIG. 4C, the +X side drive magnet 111MPX for shaking correction is partially illustrated through cutting so as to improve the visibility of the oppositely arranged +X side drive coil 113CPX for shaking correction.

The lens driving device 103 has the functions of auto focus and shaking correction, so that the unshown lens can move towards the Z axis direction so as to focus the shot image in the unshown image sensor, and the lens can efficiently swing in the X axis direction and the Y axis direction respectively (straightly swings in the X axis direction and Y axis direction in the third embodiment) so as to inhibit the shot image in the image sensor from shifting.

As shown in FIG. 4A, the lens driving device 103 is integrally formed in the shape of a cuboid, and the unshown lens is maintained at the central part of the lens driving device 103. The lens driving device 103 includes: a lens support 123 for mounting the lens; two platelike spring components 143 for supporting the lens support 123 in the suspended manner to be capable of moving in the Z axis direction; the electromagnetic drive mechanism 173 for focus composed of focus coils 173C and focus magnets 173M; the electromagnetic drive mechanism 113 for shaking correction composed of shaking correction coils 113C and shaking correction magnets 113M; a square frame-shaped magnet support 133 for supporting the focus magnets 173M and the shaking correction magnets 113M; a base substrate 193 for mounting the shaking correction coils 113C; and linear spring components 183 for connecting the platelike spring components 143 with the base substrate 193 and supporting the lens support 123 in the suspended manner to be capable of swinging in the X axis direction and the Y axis direction respectively.

The focus coils 173C are wound around the axis parallel to the Z axis, and are mounted to the outer diameter part of the lens support 123 formed in the shape of a barrel. The four focus magnets 173M are formed in the shapes of cuboids, are mounted inside the +X side square frame, −X side square frame, +Y side square frame and the −Y side square frame of the magnet support 133 respectively, and are isolated from the focus coils 173C at intervals in the radial direction and are arranged opposite to the focus coils 173C.

The base substrate 193 is a square platelike component with a circular opening defined in the Z axis direction in the central part. The shaking correction coils 113C are mounted to the +Z side face of the base substrate 193. The shaking correction coils 113C include: a +X side drive coil 113CPX wound around the axis parallel to the Z axis and mounted close the +X side of the base substrate 193; a −X side drive coil 113CMX wound around the axis parallel to the Z axis and mounted close the −X side of the base substrate 193; a +Y side drive coil 113CPY wound around the axis parallel to the Z axis and mounted close the +Y side of the base substrate 193; and a −Y side drive coil 113CMY wound around the axis parallel to the Z axis and mounted close the −Y side of the base substrate 193; and these drive coil components for shaking correction are all wound in the shapes of long circles.

The shaking correction magnets 113M are mounted to the −Z side end part of the magnet support 133. As shown in FIG. 4C, the shaking correction magnets 113M include: a +X side drive magnet 113MPX assembled on the +X side; a −X side drive magnet 113MMX assembled on the −X side; a +Y side drive magnet 113MPY f assembled on the +Y side; and a −Y side drive magnet 113MMY assembled on the −Y side.

The +X side drive magnet 113MPX and the −X side drive magnet 113MMX are formed in the shapes of cuboids adjacent to each other along the X direction, and are cut into a magnet plate 113MA as a forward path side magnet plate 113MA on the inner diameter side and a magnet plate 113MB as a return path side magnet plate on the outer diameter side respectively. Similarly, the +Y side drive magnet 113MPY and the −Y side drive magnet 113MMY are formed in the shapes of cuboids adjacent to each other along the Y direction, and are cut into a magnet plate 113MA as a forward path side magnet plate 113MA on the inner diameter side and a magnet plate 113MB as a return path side magnet plate on the outer diameter side respectively.

One long side of the +X side drive coil 113CPX mounted close the +X side of the base substrate 193, namely an inner diameter side coil side 113CA, and the inner diameter side magnet plate 113MA of the +X side drive magnet 113MPX mounted to the magnet support 133 are isolated at an interval along the Z axis and are arranged opposite to each other. The outer diameter side coil side 113CB as the other long side and the outer diameter side magnet plate 113MB are isolated at an interval along the Z axis direction and are arranged opposite to each other. One long side of the −X side drive coil 113CMX mounted close the −X side of the base substrate 193, namely an inner diameter side coil side 113CA, and the inner diameter side magnet plate 113MA of the −X side drive magnet 113MMX mounted to the magnet support 133 are isolated at an interval along the Z axis and are arranged opposite to each other, and the outer diameter side coil side 113CB as the other long side and the outer diameter side magnet plate 113MB are isolated at an interval along the Z axis direction and are arranged opposite to each other.

One long side of the +Y side drive coil 113CPY mounted close the +Y side of the base substrate 193, namely an inner diameter side coil side 113CA, and the inner diameter side magnet plate 113MA of the +Y side drive magnet 113MPY mounted to the magnet support 133 are isolated at an interval along the Z axis and are arranged opposite to each other, and the outer diameter side coil side 113CB as the other long side and the outer diameter side magnet plate 113MB are isolated at an interval along the Z axis direction and are arranged opposite to each other. One long side of the −Y side drive coil 113CMY mounted close the −Y side of the base substrate 193, namely an inner diameter side coil side 113CA, and the inner diameter side magnet plate 113MA of the −Y side drive magnet 113MMY mounted to the magnet support 133 are isolated at an interval along the Z axis and are arranged opposite to each other, and the outer diameter side coil side 113CB as the other long side and the outer diameter side magnet plate 113MB are isolated at an interval along the Z axis direction and are arranged opposite to each other.

In this way, the shaking correction coils 113C are composed of the +X side drive coil 113CPX, the −X side drive coil 113CMX, the +Y side drive coil 113CPY and the −Y side drive coil 113CMY. Moreover, the inner diameter side coil side 113CA as one long side is formed to be the forward path side, and is arranged opposite to the inner diameter side magnet plate 113MA; and the outer diameter side coil side 113CB as the other long side is formed to be the return path side, and is arranged opposite to the outer diameter side magnet plate 113MB.

Each platelike spring component 143 includes the +Z side platelike spring component 143F and the −Z side platelike spring component 143B. Both of the +Z side platelike spring component 143F and the −Z side platelike spring component 143B include an inner diameter part 143a, an outer diameter part 143b, four wrist parts 143c extending along the peripheral direction and connecting the inner diameter part 143a and the outer diameter part 143b. The inner diameter part 143a of the +Z side platelike spring component 143F is connected with the +Z side end part of the lens support 123, and the outer diameter part 143b of the +Z side platelike spring component 143F is connected with the +Z side end part of the magnet support 133. The inner diameter part 143a of the −Z side platelike spring component 143B is connected with the −Z side end part of the lens support 123, and the outer diameter part 143b of the −Z side platelike spring component 143B is connected with the −Z side end part of the magnet support 133. The spring component 143 is used for supporting the lens support 123 to be capable of moving in the Z axis direction in the suspended manner.

The linear spring components 183 are linear components extending along the Z axis direction so as to connect the four corners of the +Z side platelike spring component 143F of the platelike spring component 143 with the four corners of the base substrate 193, and the lens support 123 is supported to be capable of swinging in the X axis direction and the Y axis direction respectively in the suspended manner.

When viewed from a plane including the X axis and the Z axis, the inner diameter side magnet plate 113MA in the +X side drive magnet 113MPX is magnetized slantly in the direction inclined from the Z axis, so that the N pole is formed on the side of the inner diameter side drive coil side 113CA. The outer diameter side magnet plate 113MB is magnetized slantly in the direction inclined from the Z axis, so that the S pole is formed on the side of the outer diameter side drive coil side 113CB. Namely, the inner diameter side magnet plate 113MA and the outer diameter side magnet plate 113MB are magnetized slantly in the manner that the intersection angle of the magnetization directions of the inner diameter side magnet plate 113MA and the outer diameter side magnet plate 113MB are expanded in the width directions of the inner diameter side coil side 113CA and the outer diameter side coil side 113CB to form a certain angle.

Similarly, when viewed from a plane including the X axis and the Z axis, the inner diameter side magnet plate 113MA in the −X side drive magnet 113MMX is magnetized slantly in the direction inclined from the Z axis, so that the N pole is formed on the side of the inner diameter side drive coil side 113CA; and the outer diameter side magnet plate 113MB is magnetized slantly in the direction inclined from the Z axis, so that the S pole is formed on the side of the outer diameter side drive coil side 113CB. When viewed from a plane including the X axis and the Z axis, the inner diameter side magnet plate 113MA in the +Y side drive magnet 113MPY is magnetized slantly in the direction inclined from the Z axis, so that the N pole is formed on the side of the inner diameter side drive coil side 113CA; and the outer diameter side magnet plate 113MB is magnetized slantly in the direction inclined from the Z axis, so that the S pole is formed on the side of the outer diameter side drive coil side 113CB. When viewed from a plane including the Y axis and the Z axis, the inner diameter side magnet plate 113MA in the −Y side drive magnet 113MMY is magnetized slantly in the direction inclined from the Z axis, so that the N pole is formed on the side of the inner diameter side drive coil side 113CA; and the outer diameter side magnet plate 113MB is magnetized slantly in the direction inclined from the Z axis, so that the S pole is formed on the side of the outer diameter side drive coil side 113CB.

As mentioned above, the electromagnetic drive mechanism 113 for shaking correction includes the following four groups of drive magnets: a +X side electromagnetic drive mechanism 113PX composed of the +X side drive coil 113CPX and the +X side drive magnet 113MPX, a −X side electromagnetic drive mechanism 113MX composed of the −X side drive coil 113CMX and the −X side drive magnet 113MMX, a +Y side electromagnetic drive mechanism 113PY composed of the +Y side drive coil 113CPY and the +Y side drive magnet 113MPY and a −Y side electromagnetic drive mechanism 113MY composed of the −Y side drive coil 113CMY and the −Y side drive magnet 113MMY.

When the current flows in the focus coils 173C, the lorentz force in the +Z axis direction is generated by the focus coils 173C, so that the lens support 123 moves in the Z axis direction so as to focus the shot image in the unshown image sensor.

And then, when the current flows in the +X side drive coil 113CPX and the −X side drive coil 113CMX in the electromagnetic drive mechanism 113 for shaking correction respectively, the inner diameter side magnet plate 113MA and the outer diameter side magnet plate 113MB whose magnetization directions form a certain extension angle are magnetized slantly, and thus strong lorentz force in the X axis direction is generated by the +X side drive coil 113CPX and the −X side drive coil 113CMX respectively, the lens support 123 swings in the X axis direction (straightly swings in the X axis direction in the third embodiment), and the focused image can be efficiently inhibited from being fuzzy in the unshown image sensor due to shaking.

Similarly, when the current flows in the +Y side drive coil 113CPY and the −Y side drive coil 113CMY, the inner diameter side magnet plate 113MA and the outer diameter side magnet plate 113MB are magnetized slantly that the magnetization directions form a certain extension angle, and thus strong lorentz force in the Y axis direction is generated by the +Y side drive coil 113CPY and the −Y side drive coil 113CMY, so that the lens support 123 swings in the Y axis direction (straightly swings in the Y axis direction), and the focused image can be efficiently inhibited from shifting in the unshown image sensor due to shaking.

Moreover, when the current flows in the +X side drive coil 113CPX, the −X side drive coil 113CMX, the +Y side drive coil 113CPY and the −Y side drive coil 113CMY at preset distribution amounts at the same time, strong lorentz force at a suitable ratio is generated by the +X side drive coil 113CPX, the −X side drive coil 113CMX, the +Y side drive coil 113CPY and the −Y side drive coil 113CMY based on the distribution ratio of electrification amounts flowing on the sides of the +X side drive coil 113CPX, the −X side drive coil 113CMX, the +Y side drive coil 113CPY and the −Y side drive coil 113CMY, the lens can straightly swing in the synthesis direction of the X axis and the Y axis, and the focused image can be efficiently inhibited from being fuzzy in the unshown image sensor due to shaking.

Thus, in the lens driving device 103 in the third embodiment, the electromagnetic drive mechanism 113 for shaking correction can also utilize strong driving force, so that the lens maintained on the lens support 123 efficiently and straightly swings in the X axis direction and the Y axis direction respectively.

Figure 5A:
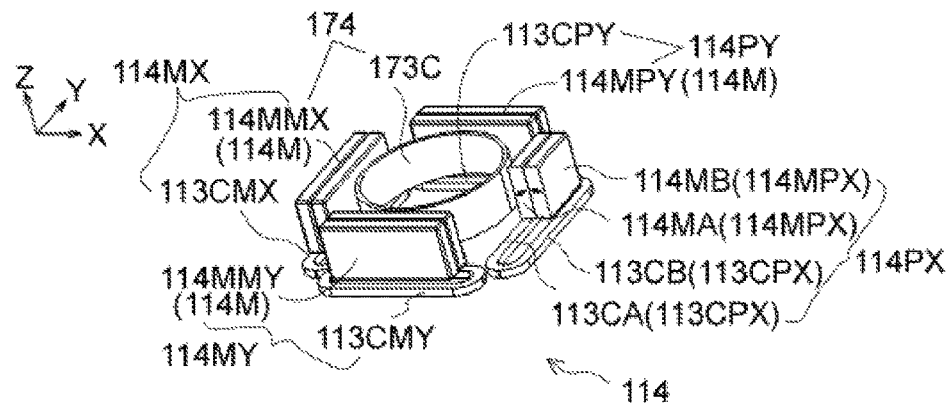
FIG. 5A is a perspective view of the main parts of an electromagnetic drive mechanism of the lens driving device in accordance of a fourth embodiment of the present invention.
Figure 5B:
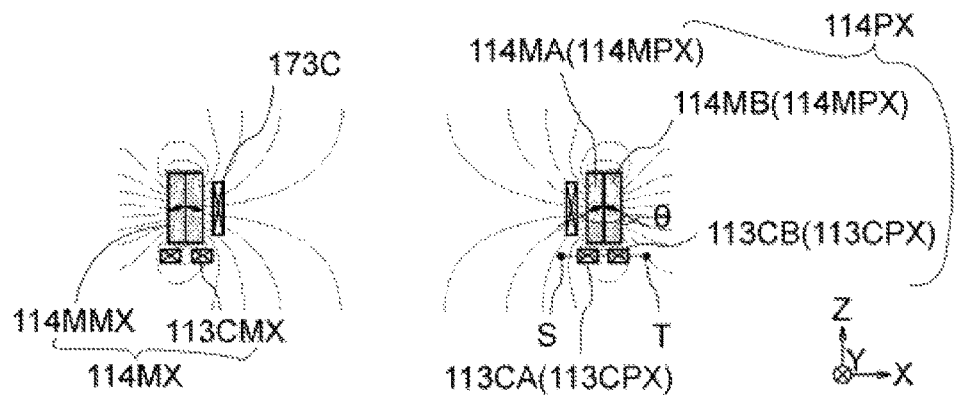
FIG. 5B is a schematic diagram illustrating a magnetic field generated by the magnets of the lens driving device in the fourth embodiment.
Figure 5C:
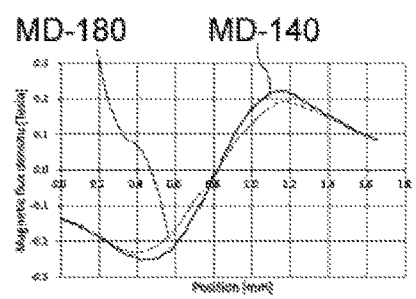
FIG. 5C is a curve graph illustrating the magnetic induction intensity crossed with the drive coils in FIG. 5A.
Figure 6A:
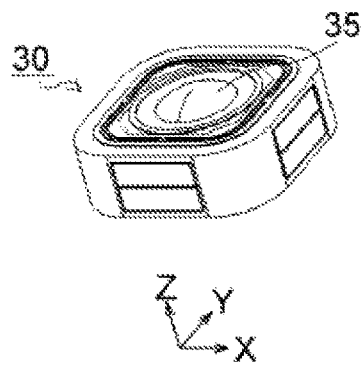
FIG. 6A is a perspective view of an existing lens driving device.
Figure 6B:
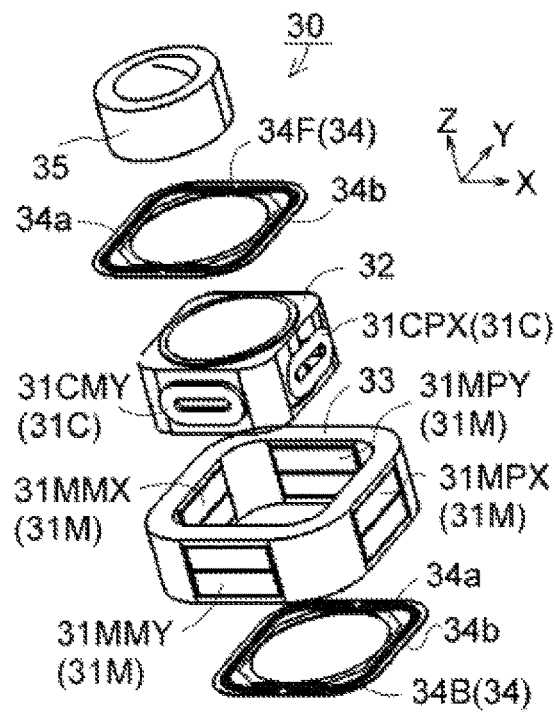
FIG. 6B is an exploded view of the existing lens driving device of FIG. 6A.
Figure 6C:
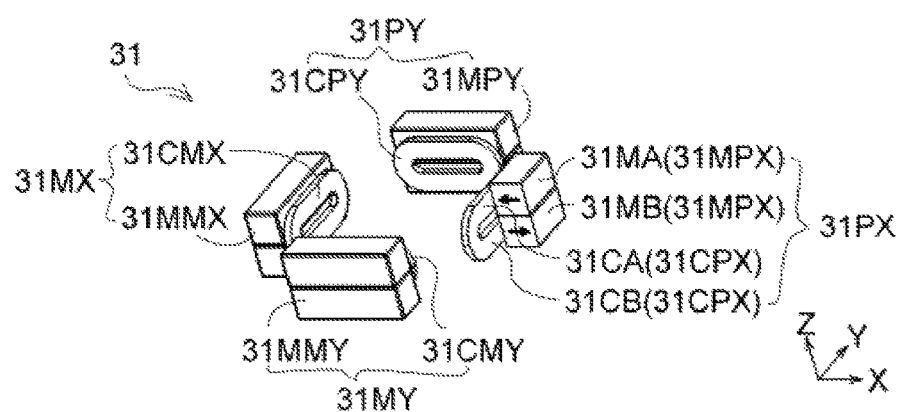
FIG. 6C is a perspective view of the main parts of an electromagnetic drive mechanism of the existing lens driving device of FIG. 6A.
Figure 6D:
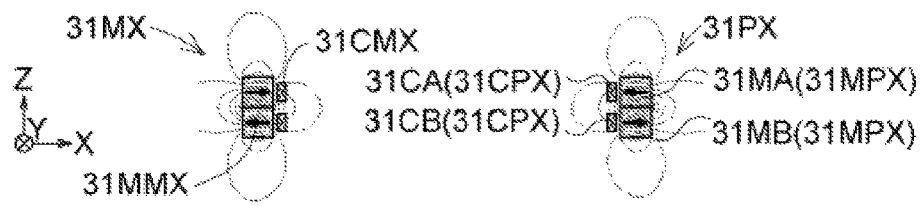
FIG. 6D is a schematic diagram illustrating the relationship of magnetization directions of the magnets and the coils of the existing lens driving device.

FIG. 5A is a main local space diagram of the electromagnetic drive mechanism 174 for focus and the electromagnetic drive mechanism 114 for shaking correction of the lens driving device 103 in the fourth embodiment of the present invention. Moreover, FIG. 5B is a magnetic figure illustrating a magnetic field generated by dual-purpose drive magnets 114M, and FIG. 5C is a diagram illustrating the magnetic induction intensity of the shaking correction coils 113 as shown in FIG. 4B. Moreover, only the part different from the lens driving device 103 in the third embodiment is illustrated in FIG. 5A, thus also refers to FIG. 4A and FIG. 4B in the following specification. Moreover, in FIG. 5C, the +X side dual-purpose drive magnet 114MPX is partially illustrated through cutting so as to improve the visibility of the oppositely arranged +X side drive coil 113CPX along the Z axis direction.

The lens driving device 103 in the fourth embodiment has the functions of auto focus and shaking correction, so that the unshown lens efficiently moves towards the Z axis direction so as to focus the shot image in the unshown image sensor, and the lens efficiently swings in the X axis direction and the Y axis direction respectively (straightly swings in the X axis direction and Y axis direction in the fourth embodiment) so as to inhibit the shot image in the image sensor from shifting.

As shown in FIG. 5A, the lens driving device 103 in the embodiment omits the shaking correction magnet 113M in the third embodiment, and the dual-purpose drive magnets 114M for focus and shaking correction are used, which is different from the third embodiment.

The lens driving device 103 in the fourth embodiment of the present invention is integrally formed in the shape of a cuboid. The lens driving device 103 in the fourth embodiment includes: the lens support 123 for mounting the lens; the platelike spring components 143 for supporting the lens support 123 in the suspended manner to be capable of moving in the Z axis direction; the electromagnetic drive mechanism 174 for focus composed of the focus coils 173C and the dual-purpose drive magnets 114M for focus and shaking correction; the electromagnetic drive mechanism 114 for shaking correction composed of the shaking correction coils 113C and the dual-purpose drive magnets 114M; the square frame-shaped magnet support 133 for supporting the dual-purpose drive magnets 114M; the base substrate 193 for mounting the shaking correction coils 113C; and the linear spring components 183 for connecting the platelike spring component 143 with the base substrate 193 and supporting the lens support 123 in the suspended manner to be capable of moving in the X axis direction and the Y axis direction respectively.

The focus coils 173C are wound around the axis parallel to the Z axis, and is mounted on the outer diameter part of the lens support 123 formed in the shape of a barrel. The dual-purpose drive magnets 114M are mounted in the +X side square frame, the −X side square frame, the +Y side square frame and the −Y side square frame of the magnet support 133 respectively. And then, as shown in FIG. 5A, the dual-purpose drive magnet 114M is composed of a +X side dual-purpose drive magnet 114MPX, a −X side dual-purpose drive magnet 114MMX, a +Y side dual-purpose drive magnet 114MPY and a −Y side dual-purpose drive magnet 114MMY.

The +X side dual-purpose drive magnet 114MPX, the −X side dual-purpose drive magnet 114MMX, the +Y side dual-purpose drive magnet 114MPY and the −Y side dual-purpose drive magnet 114MMY are formed in the shapes of square plates respectively, and each is formed by attaching two plate surfaces of the magnet plate 114MA as the forward path side magnet plate on the inner diameter side and the magnet plate 114MB as the return path side magnet plate on the outer diameter side.

The focus coils 173C and the +X side dual-purpose drive magnet 114MPX, the −X side dual-purpose drive magnet 114MMX, the +Y side dual-purpose drive magnet 114MPY and the −Y side dual-purpose drive magnet 114MMY are isolated at intervals along the radial winding direction and are arranged opposite to each other. The base substrate 193 is a square platelike component with a circular opening in the Z axis direction in the central part.

The shaking correction coils 113C are mounted to the +Z side face of the base substrate 193. The shaking correction coils 113C include: the +X side drive coil 113CPX wound around the axis parallel to the Z axis and mounted on the +X side of the base substrate 193; the −X side drive coil 113CMX wound around the axis parallel to the Z axis and mounted on the −X side of the base substrate 193; the +Y side drive coil 113CPY wound around the axis parallel to the Z axis and mounted on the +Y side of the base substrate 193; and the −Y side drive coil 113CMY wound around the axis parallel to the Z axis and mounted on the −Y side of the base substrate 193; and these drive coil components for shaking correction are respectively wound in the shapes of long circles.

When viewed from a plane including the X axis and the Z axis, the inner diameter side magnet plate 114MA in the +X side dual-purpose drive magnet 114MPX is magnetized slantly in the direction inclined from the X axis, so that the N pole is formed on the side of the focus coil 173C, the focus coil 173C is isolated at an interval along the X axis direction with the inner diameter side magnet plate 114MA and they are arranged opposite to each other. The side face on the −Z side of the inner diameter side magnet plate 114MA and the inner diameter side coil side 113CA of the +X side drive coil 113CPX are isolated at an interval along the Z axis direction and are arranged opposite to each other. When viewed from a plane including the X axis and the Z axis, the outer diameter side magnet plate 114MB is magnetized slantly in the direction inclined from the X axis, so that the N pole is formed on the side of the focus coil 173C, and the side face on the −Z side of the outer diameter side magnet plate 114MB and the outer diameter side coil side 113CB of the +X side drive coil 113CPX are isolated at an interval along the Z axis direction and are arranged opposite to each other. Namely, when the side faces on the −Z side of the inner diameter side magnet plate 114MA and the outer diameter side magnet plate 114MB are observed, the inner diameter side magnet plate 114MA and the outer diameter side magnet plate 114MB are magnetized slantly in the manner that the magnetization directions of the inner diameter side magnet plate 114MA and the outer diameter side magnet plate 114MB form a certain extension angle in the winding width directions of the inner side coil side 113CA and the outer diameter side coil side 113CB of the shaking correction coils 113C, and the side face on the −Z side of the inner diameter side magnet plate 114MA and the side face on the −Z side of the outer diameter side magnet plate 114MB are magnetized along mutually different directions.

Similarly, when viewed from a plane including the X axis and the Z axis, the inner diameter side magnet plate 114MA in the +X side dual-purpose drive magnet 114MPX is magnetized slantly in the direction inclined from the X axis, so that the N pole is formed on the side of the focus coil 173C, the focus coil 173C is isolated at an interval along the X axis direction with the inner diameter side magnet plate 114MA and they are arranged opposite to each other. The side face on the −Z side of the inner diameter side magnet plate 114MA and the inner diameter side coil side 113CA of the −X side drive coil 113CMX are isolated at an interval along the Z axis direction and are arranged opposite to each other. When viewed from a plane including the X axis and the Z axis, the outer diameter side magnet plate 114MB is magnetized slantly in the direction inclined from the X axis, so that the N pole is formed on the side of the focus coil 173C, the focus coil 173C and the outer diameter side magnet plate 114MB are isolated at an interval along the X axis direction and are arranged opposite to each other, and the side face on the −Z side of the outer diameter side magnet plate 114MB and the outer diameter side coil side 113CB of the −X side drive coil 113CPX are isolated at an interval along the Z axis direction and are arranged opposite to each other.

The inner diameter side magnet plate 114MA in the +Y side dual-purpose drive magnet 114MPY is parallel to the plane including the Z axis and the X axis and is magnetized slantly in the direction inclined from the Y axis, so that the N pole is formed on the side of the focus coil 173C, the focus coil 173C and the inner diameter side magnet plate 114MA are isolated at an interval along the Y axis direction and are arranged opposite to each other, and the side face on the −Z side of the inner diameter side magnet plate 114MA and the inner diameter side coil side 113CA of the +Y side drive coil 113CPY are isolated at an interval along the Z axis direction and are arranged opposite to each other. The outer diameter side magnet plate 114MB is parallel to the plane including the Z axis and the Y axis and is magnetized slantly in the direction inclined from the Y axis, so that the N pole is formed on the side of the focus coil 173C, the focus coil 173C and the outer diameter side magnet plate 114MB are isolated at an interval along the Y axis direction and are arranged opposite to each other, and the side face on the −Z side of the outer diameter side magnet plate 114MB and the outer diameter side coil side 113CB of the +Y side drive coil 113CPY are isolated at an interval along the Z axis direction and are arranged opposite to each other.

The inner diameter side magnet plate 114MA in the −Y side dual-purpose drive magnet 114MPY is parallel to the plane including the Z axis and the Y axis and is magnetized slantly in the direction inclined from the Y axis, so that the N pole is formed on the side of the focus coil 173C, the focus coil 173C and the inner diameter side magnet plate 114MA are isolated at an interval along the Y axis direction and are arranged opposite to each other, and the side face on the −Z side of the inner diameter side magnet plate 114MA and the inner diameter side coil side 113CA of the −Y side drive coil 113CMY are isolated at an interval along the Z axis direction and are arranged opposite to each other. The outer diameter side magnet plate 114MB is parallel to the plane including the Z axis and the Y axis and is magnetized slantly in the direction inclined from the Y axis, so that the N pole is formed on the side of the focus coil 173C, the focus coil 173C and the outer diameter side magnet plate 114MB are isolated at an interval along the Y axis direction and are arranged opposite to each other, and the side face on the −Z side of the outer diameter side magnet plate 114MB and the outer diameter side coil side 113CB of the −Y side drive coil 113CMY are isolated at an interval along the Z axis direction and are arranged opposite to each other.

In this way, the shaking correction coils 113C are composed of the +X side drive coil 113CPX, the −X side drive coil 113CMX, the +Y side drive coil 113CPY and the −Y side drive coil 113CMY. The inner diameter side coil side 113CA as one long side of these drive coils is formed into the forward path side, and is arranged opposite to the side face of the −Z side of the inner diameter side magnet plate 114MA; and the outer diameter side coil side 113CB as the other long side is formed into the return path side, and is arranged opposite to the side face of the −Z side of the outer diameter side magnet plate 114MB.

Each platelike spring component 143 includes the +Z side platelike spring component 143F and the −Z side platelike spring component 143B. Both of the +Z side platelike spring component 143F and the −Z side platelike spring component 143B include an inner diameter part 143a, an outer diameter part 143b, four wrist parts 143c extending along the peripheral direction and connecting the inner diameter part 143a and the outer diameter part 143b. The inner diameter part 143a of the +Z side platelike spring component 143F is connected with the +Z side end part of the lens support 123, and the outer diameter part 143b of the +Z side platelike spring component 143F is connected with the +Z side end part of the magnet support 133. The inner diameter part 143a of the −Z side platelike spring component 143B is connected with the −Z side end part of the lens support 123, and the outer diameter part 143b of the −Z side platelike spring component 143B is connected with the −Z side end part of the magnet support 133. The spring component 143 is used for supporting the lens support 123 to be capable of moving in the Z axis direction in the suspended manner.

The linear spring components 183 are linear components extending along the Z axis direction so as to connect the four corners of the +Z side platelike spring component 143F of the platelike spring component 143 with the four corners of the base substrate 193, and the lens support 123 is supported to be capable of moving in the X axis direction and the Y axis direction respectively in the suspended manner.

As mentioned above, the electromagnetic drive mechanism 114 for shaking correction includes the following four groups of electromagnetic drive mechanisms: the +X side electromagnetic drive mechanism 114PX for shaking correction composed of the +X side drive coil 113CPX and the +X side dual-purpose drive magnet 114MPX, the −X side electromagnetic drive mechanism 114MX composed of the −X side drive coil 113CMX and the −X side dual-purpose drive magnet 114MMX, the +Y side electromagnetic drive mechanism 114PY for shaking correction composed of the +Y side drive coil 113CPY and the +Y side dual-purpose drive magnet 114MPY, and the −Y side electromagnetic drive mechanism 114MY for shaking correction composed of the −Y side drive coil 113CMY and the −Y side dual-purpose drive magnet 114MMY.

FIG. 5B illustrates a magnetic figure when the extension angle theta (θ) formed by the magnetization directions of the inner diameter side magnet plate 114MA and the outer diameter side magnet plate 114MB of the +X side dual-purpose drive magnet 114MPX is 140 degrees. Moreover, FIG. 5C illustrates the Z axis direction components in the area (between the points S and T in FIG. 5B) that the magnetic induction intensity is respectively crossed with the inner diameter side coil side 113CA and the outer diameter side coil side 113CB of the +X side drive coil 113CPX. The dotted line (MD-180) in FIG. 5C illustrates the magnetic induction intensity when the inner diameter side magnet plate 114MA and the outer diameter side magnet plate 114MB are magnetized together along the same direction, namely, illustrates the magnetic induction intensity when the respective magnetization directions of the inner diameter side magnet plate 114MA and the outer diameter side magnet plate 114MB do not form the extension angle. Moreover, the solid line (MD-140) illustrates the magnetic induction intensity when the extension angle theta formed by the magnetization directions of the inner diameter side magnet plate 114MA and the outer diameter side magnet plate 114MB of the +X side dual-purpose drive magnet 114MPX is 140 degrees during magnetization.

According to the figure, it is clear and definite that the magnetic induction intensity crossed with the inner diameter side coil side 113CA and the outer diameter side coil side 113CB is increased by enabling the magnetization directions of the inner diameter side magnet plate 114MA and the outer diameter side magnet plate 114MB to be expanded in the direction of the oppositely arranged +X side drive coil 113CPX (the inner diameter side coil side 113CA and the outer diameter side coil side 113CB), and the lorentz force generated by the current flowing in the inner diameter side coil side 113CA and the outer diameter side coil side 113CB is improved, so that the driving efficiency of the +X side electromagnetic drive mechanism 114PX for shaking correction can be improved. Moreover, it is the same with the −X side electromagnetic drive mechanism 114MX, the +Y side electromagnetic drive mechanism 114PY and the −Y side electromagnetic drive mechanism 114MY.

When the current flows in the focus coil 173C, the lorentz force in the +Z axis direction is generated by the focus coil 173C, so that the lens support 123 moves towards the Z axis direction so as to focus the shot image in the unshown image sensor.

And then, in the +X side electromagnetic drive mechanism 114PX and the −X side electromagnetic drive mechanism 114MX, the inner diameter side magnet plate 114MA and the outer diameter side magnet plate 114MB whose magnetization directions form a certain extension angle are magnetized slantly, and thus strong lorentz force in the X axis direction is generated by the +X side drive coil 113CPX and the −X side drive coil 113CMX by enabling the current to flow in the +X side drive coil 113CPX and the −X side drive coil 113CMX in the electromagnetic drive mechanism 114 for shaking correction, so that the lens support 123 swings in the X axis direction (straightly swings in the X axis direction in the fourth embodiment), and the focused image can be efficiently inhibited from shifting in the unshown image sensor due to shaking.

Similarly, in the +Y side electromagnetic drive mechanism 114PY for shaking correction and the −Y side electromagnetic drive mechanism 114MY for shaking correction, the inner diameter side magnet plate 114MA and the outer diameter side magnet plate 114MB whose magnetization directions form a certain extension angle are magnetized slantly, and thus strong lorentz force in the Y axis direction is generated by the +Y side drive coil 113CPY and the −Y side drive coil 113CMY by enabling the current to flow in the +Y side drive coil 113CPY and the −Y side drive coil 113CMY, so that the lens support 123 swings in the Y axis direction (straightly swings in the Y axis direction), and the focused image can be efficiently inhibited from being fuzzy in the unshown image sensor due to shaking.

Moreover, the +X side drive coil 113CPX, the −X side drive coil 113CMX, the +Y side drive coil 113CPY and the −Y side drive coil 113CMY are electrified at preset distribution amounts respectively, strong lorentz force at a suitable ratio is generated by the +X side drive coil 113CPX, the −X side drive coil 113CMX, the +Y side drive coil 113CPY and the −Y side drive coil 113CMY based on the distribution ratio of electrification amounts flowing on the sides of the +X side drive coil 113CPX, the −X side drive coil 113CMX, the +Y side drive coil 113CPY and the −Y side drive coil 113CMY respectively, the lens can straightly swing in the synthesis direction of the X axis and the Y axis, and the focused image can be efficiently inhibited from being fuzzy in the unshown image sensor due to shaking.

Thus, in the lens driving device 103 in the fourth embodiment, the electromagnetic drive mechanism 114 for shaking correction can also utilize strong driving force, so that the lens maintained on the lens support 123 efficiently and straightly swings in the X axis direction and the Y axis direction respectively.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
    one or more drive coils comprising one or more forward path sides and one or more return path sides; and
    a plurality of drive magnets each comprising a forward path side magnet plate and a return path side magnet plate;
    wherein each forward path side magnet plate is isolated from a corresponding one of the one or more forward path sides at an interval and is arranged with an N pole being opposite to the corresponding one of the one or more forward path sides of the one or more drive coils;
    wherein each return path side magnet plate is isolated from a corresponding one of the one or more return path sides at an interval and is arranged with an S pole being opposite to the corresponding one of the one or more return path sides of the one or more drive coils that is the forward path side magnet plate and the return path side magnet plate of each drive magnets are magnetized respectively along different directions;
    wherein magnetization directions of the forward path side magnet plate and the return path side magnet plate of each drive magnets define an angle which is expanded towards the oppositely arranged one or more drive coils, such that on an inner diameter side of the plurality of drive magnets, magnetic lines sent from each forward path side magnet plate are expanded towards an outer side of the oppositely arranged one or more drive coils and are crossed with the forward path side of the oppositely arranged one or more drive coils, then after a direction of the magnetic lines is changed concentrated towards an outer diameter side of the plurality of drive magnets, the magnetic lines are crossed with the return path side of the oppositely arranged one or more drive coils and are finally returned to the return path side magnet plate.

2. The lens driving device according to claim 1, wherein there are a plurality of drive coils each is wound along a direction forming a right angle with an optical axis of a lens driven by the lens driving device, and each drive coil faces to and is isolated at an interval with a magnetic pole face of a corresponding one of the plurality of drive magnets along the direction forming the right angle with the optical axis.

3. The lens driving device according to claim 2, further comprising:

a lens support configured for mounting the lens, the plurality of drive coils being configured at outer peripheral side of the lens support;

a square frame-shaped magnet support configured at outer peripheral side of the lens support and configured for supporting the plurality of drive magnets; and two platelike spring components configured for supporting the lens support in a suspended manner to be capable of moving along the optical axis direction of the lens.

4. The lens driving device according to claim 1, wherein there are two drive coils wound around a direction parallel to an optical axis of a lens driven by the lens driving device; the forward path side magnet plate of each drive magnet is configured opposite to and isolated at an intervals with a magnetic pole face of one of the two drive coils along a direction forming a right angle with the optical axis of the lens, and the return path side magnet plate of each drive magnet is configured opposite to and isolated at an intervals with a magnetic pole face of the other one of the two drive coils along the direction forming a right angle with the optical axis of the lens.

5. The lens driving device according to claim 4, further comprising:

a lens support configured for mounting the lens, the two drive coils being sleeved on the outside of the lens support and acting as the forward path side and the return path side, respectively;

a magnet support configured at outer peripheral side of the lens support and configured for supporting the plurality of drive magnets; and two platelike spring components configured for supporting the lens support in a suspended manner to be capable of moving along the optical axis direction of the lens.

6. The lens driving device according to claim 1, wherein there are a plurality of drive coils each wound around a direction parallel to an optical axis of a lens driven by the lens driving device, and each drive coil faces to and is isolated at an interval with a magnetic pole face of a corresponding one of the plurality of drive magnets along the direction parallel to the optical axis.

7. The lens driving device according to claim 6, further comprising:

a lens support configured for mounting the lens;

a focus coil wound around the optical axis and configured at the outside of the lens support;

a plurality of focus magnets configured at the outer peripheral side of the focus coil;

a frame-shaped magnet support configured at outer peripheral side of the lens support and configured for supporting the plurality of focus magnets and the plurality of drive magnets;

a base substrate configured for mounting the plurality of drive coils;

two platelike spring components configured for supporting the lens support in a suspended manner to be capable of moving along the optical axis direction of the lens; and a plurality of linear spring components configured for connecting the platelike spring components with the base substrate and supporting the lens support in a suspended manner to be capable of swinging in directions perpendicular to the optical axis.

8. The lens driving device according to claim 1, wherein there are a plurality of drive coils each wound around a direction parallel to an optical axis of a lens driven by the lens driving device, and each drive coil faces to and is isolated at an interval with a side face of a corresponding one of the plurality of drive magnets along the direction parallel to the optical axis;

the side face of each drive magnet is adjacent with its magnetic pole face.

9. The lens driving device according to claim 8, further comprising:

a lens support configured for mounting the lens;

a focus coil wound around the optical axis and configured at the outside of the lens support;

a frame-shaped magnet support configured at outer peripheral side of the lens support and configured for supporting the plurality of drive magnets;

a base substrate configured for mounting the plurality of drive coils; and two platelike spring components configured for supporting the lens support in a suspended manner to be capable of moving along the optical axis direction of the lens;

wherein the plurality of drive magnets serve in a focus function and a shaking correction function.

* * * * *